United States Patent
Sibbach et al.

(10) Patent No.: US 12,338,769 B2
(45) Date of Patent: Jun. 24, 2025

(54) TURBINE ENGINE INCLUDING A STEAM SYSTEM

(71) Applicant: General Electric Company, Schenectady, NY (US)

(72) Inventors: Arthur W. Sibbach, Boxford, MA (US); Aaron M. Dziech, Crittenden, KY (US); Scott Alan Schimmels, Miamisburg, OH (US); Robert R. Rachedi, Morrow, OH (US); Jeffrey D. Rambo, Mason, OH (US); Brandon W. Miller, Middletown, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/463,782

(22) Filed: Sep. 8, 2023

(65) Prior Publication Data
US 2025/0084789 A1    Mar. 13, 2025

(51) Int. Cl.
*F01K 23/10*     (2006.01)
*B64D 27/10*    (2006.01)
*F02C 6/18*      (2006.01)

(52) U.S. Cl.
CPC .............. *F02C 6/18* (2013.01); *B64D 27/10* (2013.01); *F01K 23/10* (2013.01)

(58) Field of Classification Search
CPC .... F02C 7/224; F02C 6/18; F02C 3/30; F01K 23/10
See application file for complete search history.

(56) References Cited

U.S. PATENT DOCUMENTS

| | | | |
|---|---|---|---|
| 4,631,914 A | | 12/1986 | Hines |
| 5,357,746 A | * | 10/1994 | Myers ............... F02C 7/224 |
| | | | 60/39.182 |

(Continued)

FOREIGN PATENT DOCUMENTS

| | | |
|---|---|---|
| FR | 3127269 A1 | 3/2023 |
| FR | 3130896 A1 | 6/2023 |

(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — Thuyhang N Nguyen
(74) *Attorney, Agent, or Firm* — Venable LLP; David D. Leege; Michele V. Frank (57) ABSTRACT

A turbine engine for an aircraft. The turbine engine includes a combustor fluidly coupled to a fuel delivery assembly to receive fuel from the fuel delivery assembly. The fuel is injected into the combustor and combusted in the combustor to generate combustion gases. A condenser is located downstream of a turbine to receive the combustion gases and to condense water. The fuel heat exchanger is thermally coupled to the condenser to receive heat from the water condensed by the condenser. The fuel heat exchanger is located in the fuel delivery assembly to receive the fuel and to transfer the heat received from the water to the fuel. The boiler is located downstream of the fuel heat exchanger. The boiler receives the water and is fluidly connected to the combustor to receive the combustion gases and to boil the water to generate steam.

10 Claims, 4 Drawing Sheets

(56) References Cited

U.S. PATENT DOCUMENTS

| | | | |
|---|---|---|---|
| 5,784,875 | A | 7/1998 | Statler |
| 5,896,740 | A | 4/1999 | Shouman |
| 9,676,491 | B2 | 6/2017 | Epstein et al. |
| 9,701,416 | B2 | 7/2017 | Epstein et al. |
| 9,765,691 | B2 | 9/2017 | Delgado et al. |
| 9,932,124 | B2 | 4/2018 | Kamath et al. |
| 10,012,141 | B2 | 7/2018 | Pendray |
| 11,008,897 | B2 * | 5/2021 | Juretzek ............... F02C 7/224 |
| 11,415,054 | B2 * | 8/2022 | Sekiguchi ............. F02C 7/224 |
| 11,603,798 | B1 | 3/2023 | Terwilliger et al. |
| 11,702,958 | B2 | 7/2023 | Schimmels et al. |
| 11,920,526 | B1 * | 3/2024 | Terwilliger ............. F02C 7/22 |
| 12,006,866 | B2 * | 6/2024 | Terwilliger ............. F02C 3/22 |
| 2014/0182264 | A1 | 7/2014 | Weisgerber et al. |
| 2018/0363557 | A1 * | 12/2018 | Sumimura ............. F22D 1/14 |
| 2019/0234243 | A1 * | 8/2019 | Shino ..................... F02C 6/18 |
| 2024/0026817 | A1 * | 1/2024 | Rocco ................... F02C 3/30 |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |
| JP | 2016510376 A | 4/2016 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (Switch) Introduction at the 2023 NPSS Annual Consortium Meeting, Mar. 10, 2023.

Miller et al., U.S. Appl. No. 17/724,074, filed Apr. 19, 2022 [Available in IFW].

* cited by examiner

TURBINE ENGINE INCLUDING A STEAM SYSTEM

TECHNICAL FIELD

The present disclosure relates generally to turbine engines including a steam system.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "bypass ratio" of a turbine engine is a ratio of bypass air through a bypass of the turbine engine to core air through a core inlet of a core turbine engine of the turbine engine. For example, the bypass ratio is a ratio of bypass air 62 entering the bypass airflow passage 56 to core air 64 entering the core turbine engine 16.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. The steam system thus includes hot water that may be used as a heat transfer medium to transfer heat between various fluids and systems of the turbine engine. More specifically, in the embodiments discussed herein, the fuel is heated by the water from the steam system. Such systems may be particularly beneficial when the fuel is a cryogenic fuel, such as hydrogen fuel. The water may be used to transfer heat to the fuel and to heat (or vaporize) the fuel.

Figure 1:
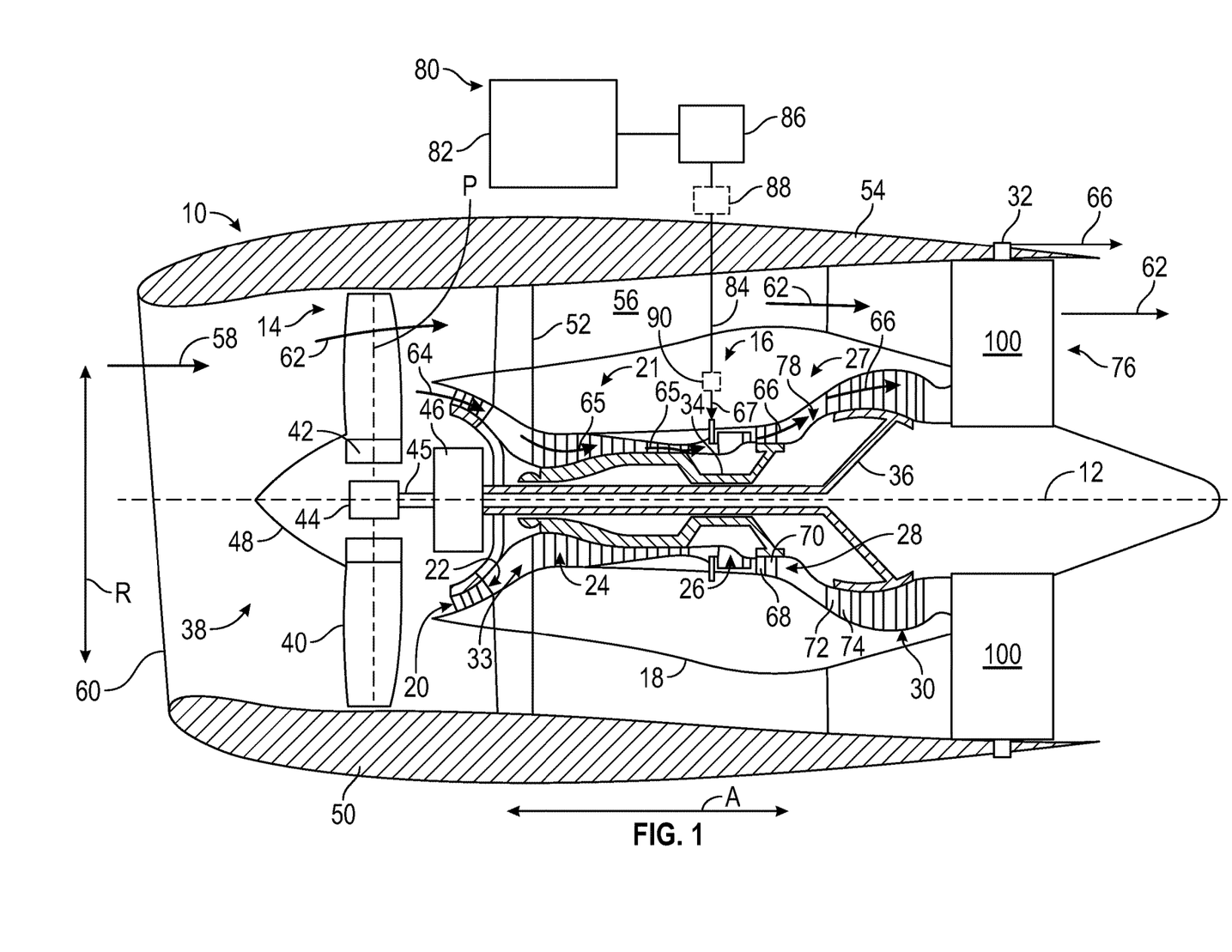
FIG. 1 is a schematic cross-sectional diagram of a turbine engine including a steam system, taken along a longitudinal centerline axis of the turbine engine, according to the present disclosure.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a core turbine engine 16 disposed downstream from the fan section 14.

The core turbine engine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure (LP) shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the core air flow path 33, or, more specifically, into the core inlet 20. The ratio between the first portion of air (bypass air 62) and the second portion of air (core air 64) is known as a bypass ratio. In some embodiments, the bypass ratio is greater than 18:1, enabled by a steam system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 enables the HPT 28 to have a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the core turbine engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the core turbine engine 16.

As noted above, the compressed air 65 (the core air 64) is mixed with the fuel 67 in the combustor 26 to generate a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. Steam 178 injected directly into or upstream of the combustor 26 adds mass flow to the core air 64 such that less core air 64 is needed to produce the same amount of work through the turbine section 27. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and convert the liquid hydrogen fuel into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
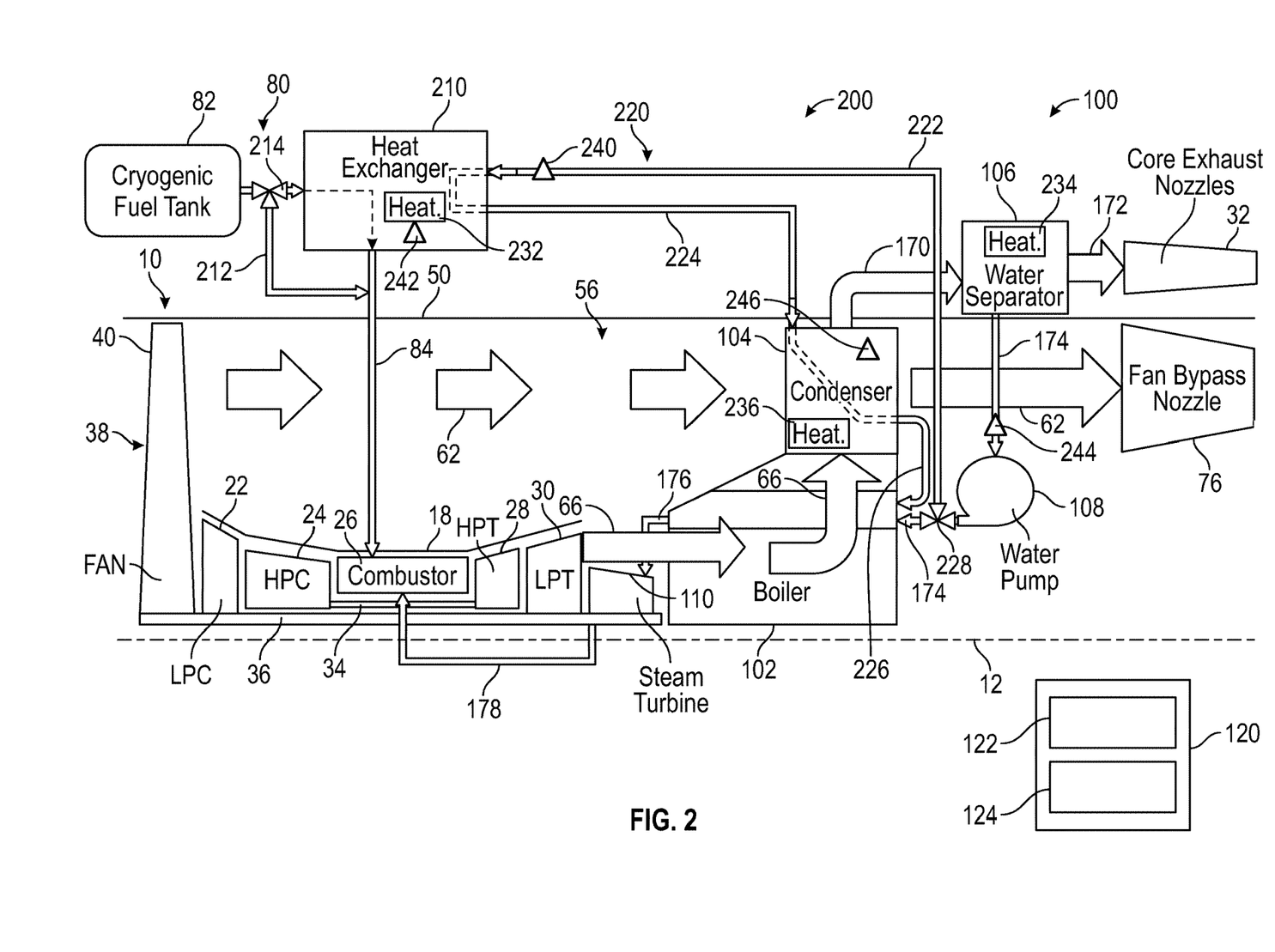
FIG. 2 is a schematic diagram of the turbine engine and a steam system with a thermal transport system according to an embodiment of the present disclosure.

FIG. 2 is a schematic diagram of the turbine engine 10 and the steam system 100 of FIG. 1 having a thermal transport system 200 according to the present disclosure. For clarity with the other thermal transport systems discussed herein, the thermal transport system 200 of this embodiment will be referred to as a first thermal transport system 200. The turbine engine 10 is shown schematically in FIG. 2 and some components are not shown in FIG. 2. The steam system 100 includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and, in this embodiment, is positioned within the bypass airflow passage 56. The condenser 104, however, may be positioned elsewhere and thermally connected to other cooling sources, such as being thermally connected to the fuel 67 to transfer heat to the fuel 67, particularly, when the fuel 67 is a cryogenic fuel such as hydrogen fuel. The condenser 104 can include any type of condenser for condensing water from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the core turbine engine 16. The water separator 106 may be driven to rotate by one of the engine shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water through the boiler 102 where it is converted back to steam. This steam is sent through the steam turbine 110 then injected into core air flow path 33, such as into the combustor 26.

In operation, the combustion gases 66, also referred to as exhaust, flow from the LPT 30 into the boiler 102. The combustion gases 66 transfer heat into the water 174 (e.g., in liquid form) within the boiler 102, as detailed further below. The combustion gases 66 then flow into the condenser 104. The condenser 104 condenses the water 174 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 174 from the combustion gases 66, to generate an exhaust-water mixture 170. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 170 flows into the water separator 106. The water separator 106 separates the water 174 from the exhaust of the exhaust-water mixture 170 to generate separate exhaust 172 and the water 174. The exhaust 172 is exhausted out of the turbine engine 10 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 170, and the exhaust 172 through the steam system 100 of the turbine engine 10.

The water pump 108 pumps the water 174 (e.g., in liquid form) through one or more water lines (as indicated by the arrow for the water 174 in FIG. 2) and the water 174 flows through the boiler 102. As the water 174 flows through the boiler 102, the combustion gases 66 flowing through the boiler 102 transfer heat into the water 174 to vaporize the water 174 and to generate the steam 176 (e.g., vapor). The steam turbine 110 includes one or more stages of steam turbine blades (not shown) and steam turbine stators (not shown). The steam 176 flows from the boiler 102 into the steam turbine 110, through one or more steam lines (as indicated by the arrow for the steam 176 in FIG. 2), causing the steam turbine blades of the steam turbine 110 to rotate, thereby generating additional work in an output shaft (e.g., one of the core shafts) connected to the turbine blades of the steam turbine 110.

As noted above, the core turbine engine 16 includes shafts, also referred to as core shafts, coupling various rotating components of the core turbine engine 16 and other thrust producing components such as the fan 38. In the core turbine engine 16 shown in FIG. 1, these core shafts include the HP shaft 34 and the LP shaft 36. The steam turbine 110 is coupled to one of the core shafts of the core turbine engine 16, such as the HP shaft 34 or the LP shaft 36. In the illustrated embodiment, the steam turbine 110 is coupled to the LP shaft 36. As the steam 176 flows from the boiler 102 through the steam turbine 110, the kinetic energy of this gas is converted by the steam turbine 110 into mechanical work in the LP shaft 36. The reduced temperature steam (as steam 178) exiting the steam turbine 110 is then injected into the core air flow path 33, such as into the combustor 26, upstream of the combustor 26, or downstream of the combustor 26. The steam 178 flows through one or more steam lines from the steam turbine 110 to the core air flow path 33. The steam 178 injected into the core air flow path 33 adds mass flow to the core air 64 such that less core air 64 is needed to produce the same amount of work through the turbine section 27. In this way, the steam system 100 extracts additional work from the heat in exhaust gas that would otherwise be wasted. The steam 178 injected into the core air flow path 33 is in a range of 20% to 50% of the mass flow through the core air flow path 33.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the steam system 100 recovers approximately 70% of the water 174 and converts the water 174 into the steam 176. The steam turbine 110 has a pressure expansion ratio in a range of 2:1 to 6:1, the LPT 30 has a pressure expansion ratio in a range of 4.5:1 to 28:1, and the steam 178 contributes to 20% to 50% of the mass flow through the core air flow path 33. The steam turbine 110 expands the steam 176, thereby reducing the energy of the steam 178 exiting the steam turbine 110 and reducing the temperature of the steam 178 to approximately a temperature of the compressed air 65 (see FIG. 1) that is discharged from the HPC 24. Such a configuration enables the steam 178 to reduce hot spots in the combustor 26 from the combustion of the fuel (e.g., in particular when the fuel is supercritical hydrogen or gaseous hydrogen).

The steam 178 injected into the core air flow path 33 also enables the HPT 28 to have a greater energy output with fewer stages of the HPT 28 as compared to HPTs without the benefit of the present disclosure. For example, the additional mass flow from the steam 178 through the turbine section 27 helps to produce a greater energy output. In this way, HPT 28 may only have one stage capable sustainably driving a higher number of stages of the HPC 24 (e.g., 10, 11, or 12 stages of the HPC 24) due to the higher mass flow (resulting from the steam injection) exiting the combustor 26. The steam 178 that is injected into the core air flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 176, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the core turbine engine 16 provided by the steam 176, 178 injected into the core turbine engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves are preferably positioned between a fourth stage of the HPC 24 and a last stage of the HPC 24. The HPC stator vanes that are variable stator vanes, and the one or more compressor bleed valves help to balance the air flow (e.g., the compressed air 65) through all stages of the HPC 24. Such a balance, in combination with the steam 178 injected into the core air flow path 33, enables the number of stages of the HPC 24 to include ten to twelve stages for compression ratios to be greater than 20:1, and preferably in a range of 20:1 to 40:1.

The additional work that is extracted by the steam system 100 and the steam 178 injected into the core air flow path 33 enables a size of the core turbine engine 16 (FIG. 1) to be reduced, thereby increasing the bypass ratio of the turbine engine 10, as compared to turbine engines without the benefit of the present disclosure. In this way, the turbine engine 10 has a bypass ratio greater than 18:1, preferably, in a range of 18:1 to 100:1, more preferably, in a range of 25:1 to 85:1, and, most preferably, in a range of 28:1 to 70:1. In this way, the steam system 100 can enable an increased bypass ratio in which the turbine engine 10 can move a larger mass of air through the bypass, reducing the pressure ratio of the fan 38 and increasing the efficiency of the turbine engine 10 as compared to turbine engines without the benefit of the present disclosure.

The turbine engine 10 may also include an engine controller 120. The engine controller 120 is configured to operate various aspects of the turbine engine 10, including, in this embodiment, the water pump 108, a fuel bypass valve 214, a selector valve 228, a first heater 232, a second heater 234, and a third heater 236. The engine controller 120 may be a Full Authority Digital Engine Control (FADEC). In this embodiment, the engine controller 120 is a computing device having one or more processors 122 and one or more memories 124. The processor 122 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 124 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 124 can store information accessible by the processor 122, including computer-readable instructions that can be executed by the processor 122. The instructions can be any set of instructions or a sequence of instructions that, when executed by the processor 122, causes the processor 122 and the engine controller 120 to perform operations. In some embodiments, the instructions can be executed by the processor 122 to cause the processor 122 to complete any of the operations and functions for which the engine controller 120 is configured, as will be described further below. The instructions can be software written in any suitable programming language, or can be implemented in hardware. Additionally, and/or alternatively, the instructions can be executed in logically and/or virtually separate threads on the processor 122. The memory 124 can further store data that can be accessed by the processor 122.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Heating the fuel 67 (FIG. 1) prior to injecting the fuel 67 into the combustor 26 may be used for various reasons. Some fuels, such as hydrocarbon-based fuels may be heated, for example, to prevent ice formation or for performance benefits. Other fuels, such as cryogenic fuels, may be heated and vaporized (converted from a liquid state in which the cryogenic fuel is stored to a vapor state for combustion), prior to being injected into the combustor 26. As noted above, the embodiments discussed herein utilize a thermal transport system to transfer heat from the turbine engine 10 and to use that heat to help heat the fuel 67. More specifically, in the embodiments discussed herein, the water 174 is used as the heat transfer fluid to transfer heat from the steam system 100 to the fuel 67 in the fuel system 80. The following discussion makes reference to cryogenic fuel and, more specifically, hydrogen fuel, but the thermal transport systems discussed herein may be applicable to other fuel systems.

The fuel tank 82 is configured to hold the hydrogen fuel at least partially within the liquid phase and is configured to provide hydrogen fuel to the fuel delivery assembly 84 substantially completely in the liquid phase, such as completely in the liquid phase. The fuel tank 82 has a fixed volume and contains a volume of the hydrogen fuel in the liquid phase (e.g., liquid hydrogen fuel). As the fuel tank 82 provides hydrogen fuel to the fuel delivery assembly 84 substantially completely in the liquid phase, the volume of the liquid hydrogen fuel in the fuel tank 82 decreases and the remaining volume in the fuel tank 82 is made up by, for example, hydrogen substantially completely in the gaseous phase (gaseous hydrogen). As used herein, the term "substantially completely" is used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 82 at very low (cryogenic) temperatures, and, thus, the fuel tank 82 may also be referred to herein as a cryogenic fuel tank. For example, the hydrogen fuel may be stored in the fuel tank 82 at about −253 degrees Celsius (twenty Kelvin) or less at atmospheric pressure, or at other temperatures and pressures to maintain the hydrogen fuel substantially completely in the liquid phase. In some embodiments, the hydrogen fuel may be stored in the fuel tank 82 at temperatures from −259 degrees Celsius (fourteen Kelvin) to −243 degrees Celsius (thirty Kelvin), and, more preferably, from −253 degrees Celsius (twenty Kelvin) to −243 degrees Celsius (thirty Kelvin). To store the hydrogen fuel in the liquid phase, the fuel tank 82 stores and maintains the hydrogen cryogenically and may be a cryostat. The fuel tank 82 may thus be, for example, a dual wall tank, including an inner vessel (e.g., an inner cryogenic liquid tank) and an outer vessel (e.g., a vacuum vessel). The inner vessel may be positioned within the outer vessel with a gap formed between the inner vessel and the outer vessel. To provide thermal isolation for the inner vessel, the gap may be under vacuum. The gap may include a void space or be an entirely void space, but, alternatively, the gap may include multi-layer insulation (MLI), such as aluminized Mylar®, for example.

The turbine engine 10 shown in FIG. 2 includes the first thermal transport system 200 that may be used to transfer heat from the steam system 100 to the fuel system 80. The first thermal transport system 200 includes a fuel heat exchanger 210 fluidly connected to the fuel delivery assembly 84. The fuel heat exchanger 210 of this embodiment is a fuel/water heat exchanger, and as the fuel 67 flows from the fuel tank 82 to the combustor 26, the fuel 67 absorbs (receives) heat from the water 174 of the steam system 100 and is heated. In some embodiments, the fuel heat exchanger 210 may be one of the vaporizers 88 discussed above. Although the fuel heat exchanger 210 may also be in addition to the vaporizers 88. The fuel heat exchanger 210 may be any suitable heat exchanger, including, for example, a plate heat exchanger or a tubular heat exchanger.

There may be instances when heating the fuel 67 with the water 174 is not desirable or when removing heat from the water 174 is not desirable. Such conditions include startup, as discussed further below, when the water 174 is not sufficiently hot enough to flow through the fuel heat exchanger 210 and to heat the fuel 67. Accordingly, the fuel system 80 of this embodiment includes a fuel bypass line 212 (i.e., a fuel bypass flow path) that fluidly connects a portion of the fuel delivery assembly 84 upstream of the fuel heat exchanger 210 with a portion of the fuel delivery assembly 84 downstream of the fuel heat exchanger 210, thus, bypassing the fuel heat exchanger 210. The fuel system 80 is, thus, selectively operable to redirect the fuel 67, or a portion thereof, and to bypass the fuel heat exchanger 210. The fuel bypass line 212 includes a fuel bypass valve 214 located in the fuel bypass line 212 and the fuel delivery assembly 84. The fuel bypass valve 214 is operable to open and to direct the fuel 67 through the fuel bypass line 212, bypassing the fuel heat exchanger 210, and, thus, the fuel bypass valve 214 selectively operates the fuel system 80 to bypass the fuel heat exchanger 210. The fuel bypass valve 214 may be any suitable valve including a three-way valve. The fuel bypass valve 214 may also be a flow control valve (e.g., a proportional control valve) that directs a portion of the fuel 67 and or controls the flow of the fuel 67 through the fuel heat exchanger 210 and the fuel bypass line 212. The fuel bypass valve 214 may be any suitable valve including, for example, an electrically operable valve, a hydraulically operable valve, or a pneumatically operable valve. When the fuel bypass valve 214 is hydraulically operable, the hydraulic fluid may be suitable fluids of the turbine engine 10 including, for example, the fuel 67, lubrication oil, and the like.

The first thermal transport system 200 includes a heat transfer loop 220 that thermally couples the condenser 104 with the fuel heat exchanger 210 to transfer heat from the condenser 104 with the fuel heat exchanger 210. More specifically, the water 174 flows through the heat transfer loop 220 to transfer heat from the condenser 104 to the fuel heat exchanger 210. The heat transfer loop 220 includes a supply line 222. The supply line 222 is fluidly connected to the line conveying the water 174 between the water pump 108 and the boiler 102. Thus, the supply line 222 is fluidly connected downstream of the water pump 108 and upstream of the boiler 102. As noted above, the water pump 108 directs the separated liquid water 174 through the boiler 102, and, with the location of the water pump 108 relative to the supply line 222, the water pump 108 may also be used to direct the flow of the water 174 through the first thermal transport system 200. The water 174 thus flows from the water pump 108 through the supply line 222 to the fuel heat exchanger 210.

Although the exhaust-water mixture 170 has been cooled to a temperature low enough to condense water from the combustion gases 66, the temperature of the water 174 may still be relatively high, such as from one hundred degrees Fahrenheit (100° F.) (thirty-eight degrees Celsius (38° C.)) to two hundred twelve degrees Fahrenheit (212° F.) (one hundred degrees Celsius (100° C.)) and more likely from one hundred fifty degrees Fahrenheit (150° F.) (sixty-six degrees Celsius (66° C.)) to two hundred twelve degrees Fahrenheit (212° F.) (one hundred degrees Celsius (100° C.)). Such temperatures are still higher than the temperature of the fuel 67, particularly, when the fuel is a cryogenic liquid fuel, such as hydrogen fuel, stored in the fuel tank 82 at cryogenic temperatures. Thus, as the water 174 flows through the fuel heat exchanger 210, the heat from the water 174 is transferred from the water 174 to the fuel 67, and the fuel 67 absorbs the heat from the water 174. The fuel 67 is thus heated and may be vaporized by the heat from the water 174 and the water 174 is cooled.

The water 174 then flows from the fuel heat exchanger 210 back to the boiler 102 where the water 174 can then be heated to form the steam 176 in the manner discussed above. The first thermal transport system 200 thus includes a return line 226 through which the water 174 flows from the fuel heat exchanger 210 and into the boiler 102. In FIG. 2, the return line 226 is shown as being fluidly connected to the boiler 102, but, alternatively, the return line 226 may be fluidly connected to a water line upstream of the boiler 102, such as a waterline directly connecting the water pump 108 with the boiler 102.

The water 174, having been cooled by the fuel 67, may be preheated before flowing into the boiler 102. A preheat heat exchanger may be located in the return line 226 to preheat the water 174. In this embodiment, the preheat heat exchanger is the condenser 104. The first thermal transport system 200 includes an intermediate return line 224 fluidly connecting the fuel heat exchanger 210 to a flow passage within the condenser 104, and the return line 226 fluidly connects the flow passage of the condenser 104 to the boiler 102. The water 174 may thus be preheated by the combustion gases 66 flowing through the condenser 104 before being introduced into the boiler 102.

The heat transfer loop 220 may be selectively operable such that the heat transfer loop 220 may be isolated or such that only a portion of the water 174 flows through the heat transfer loop 220. The heat transfer loop 220 includes a selector valve 228 located in the water line between the water pump 108 and the boiler 102. The selector valve 228 is operable to open and to direct the water 174 through the supply line 222 and to the fuel heat exchanger 210. The selector valve 228 may be any suitable valve including a three-way valve. The selector valve 228 may also be a flow control valve (e.g., a proportional control valve) that directs a portion of the water 174 and or controls the flow of the water 174 through the heat transfer loop 220. As with the fuel bypass valve 214 discussed above, the selector valve 228 may be an electrically operable valve, a hydraulically operable valve, or a pneumatically operable valve.

The water 174 is used as the heat transfer medium of the heat transfer loop 220 of this embodiment. To avoid freezing the water 174, the first thermal transport system 200 includes a plurality of heaters, including a first heater 232, a second heater 234, and a third heater 236. Any suitable heater may be used including, for example, one or more electrical resistance heaters, a catalytic heater, or a burner. In some environments, startup of the turbine engine 10 may occur at cold temperatures (e.g., as low as negative forty degrees Fahrenheit (−40° F.) (negative forty degrees Celsius (−40° C.))). At startup, the turbine engine 10 and, more specifically, the combustor 26, has not begun to operate and, thus, the components in the hot gas path 78 (FIG. 1) are closer to ambient conditions than their operational temperatures. With the components of the steam system 100 and/or the first thermal transport system 200 at these cold temperatures, the water 174 within the steam system 100 and the first thermal transport system 200 may freeze when the water 174 comes into contact with these components. To avoid such freezing, the heaters 232, 234, 236 are used to increase the temperature of these components above the freezing point of water (thirty-two degrees Fahrenheit (32° F.) (zero degrees Celsius (0° C.))), such as from thirty-five degrees Fahrenheit (35° F.) (one degree Celsius (1° C.)) to fifty degrees Fahrenheit (50° F.) (ten degrees Celsius (10° C.)). The first heater 232 may be located in the fuel heat exchanger 210 and used to raise the temperature of the fuel heat exchanger 210. The second heater 234 may be located in the water separator 106 and used to raise the temperature of the water separator 106. The third heater 236 may be located in the condenser 104 and used to raise the temperature of the condenser 104.

One or more temperature sensors (e.g., a first temperature sensor 240, a second temperature sensor 242, a third temperature sensor 244, and a fourth temperature sensor 246) may be used with the heaters 232, 234, 236 to provide input to operate the heaters 232, 234, 236 to heat the components as discussed above. The second temperature sensor 242 may be located within the fuel heat exchanger 210 and used to detect the temperature of the fuel heat exchanger 210. The second temperature sensor 242 may be communicatively coupled to the first heater 232 and, thus, provides input to operate the first heater 232 based on the temperatures sensed by the second temperature sensor 242. Similarly, the fourth temperature sensor 246 is located within the condenser 104 and may be used to detect the temperature of the condenser 104. The third heater 236 may be operated to increase the temperature of the condenser 104 based on the temperature sensed by the fourth temperature sensor 246. The first heater 232 and the third heater 236 may thus be operated to increase the temperature of the fuel heat exchanger 210 and the third heater 236, respectively, to increase the temperatures of these components, as discussed above.

When the temperatures of the fuel heat exchanger 210 and the condenser 104 have increased sufficiently, the water 174 may be circulated through the water line connecting the water separator 106 to the boiler 102 and the heat transfer loop 220. The water 174 may be initially heated within the water separator 106 by the second heater 234. The first temperature sensor 240 may be located in the supply line 222 to determine the temperature of the supply line 222 and the water 174 flowing therein. Similarly, the third temperature sensor 244 may be located in a water line positioned downstream of the water separator 106 and upstream of the boiler 102 to determine the temperature of the water line and the water 174 flowing therein. The second heater 234 positioned in the water separator 106 may be used to increase the temperature of the water separator 106 and also the water 174 before flowing through the steam system 100 and the first thermal transport system 200. The first temperature sensor 240 and the third temperature sensor 244 may thus be used to monitor the temperature of the water 174 and to provide input to operate the heaters 232, 234, 236 based on these temperatures.

When the fuel 67 is a cryogenic fuel, the fuel 67 may be directed through the fuel bypass line 212 during startup operations to avoid cooling the fuel heat exchanger 210 and negating the effects of the first heater 232. As the water 174 increases in temperature, as detected by, for example, the first temperature sensor 240, the fuel bypass valve 214 may be operated to slowly introduce the fuel 67 into the fuel heat exchanger 210.

A method of starting-up the turbine engine 10 may start with the steam injection system off due to the potential for sub-freezing temperatures. The fuel bypass valve 214 may be positioned to bypass the fuel heat exchanger 210 and have fuel 67 flow through the fuel bypass line 212. The selector valve 228 is also positioned to direct all of the water 174 to the boiler 102 and to bypass the heat transfer loop 220. The turbine engine 10 is started with the water pump 108 off. The turbine engine 10 is brought up to idle using, for example, a starter motor. Using the second temperature sensor 242, the temperature of the fuel heat exchanger 210 is measured. If the temperature of the fuel heat exchanger 210 is not above a heater threshold temperature, the first heater 232 is used to heat the fuel heat exchanger 210 to the temperatures discussed above. Preferably, the heater threshold temperature is greater than the freezing temperature of water (i.e., greater than thirty-two degrees Fahrenheit (32° F.) (zero degrees Celsius (0° C.))), such as from thirty-five degrees Fahrenheit (35° F.) (one degree Celsius (1° C.)) to fifty degrees Fahrenheit (50° F.) (ten degrees Celsius (10° C.)). If (or once) the temperature of the fuel heat exchanger 210 reaches the heater threshold temperature, the water pump 108 and/or the selector valve 228 is modulated (controlled) to send at least some water 174 through the heat transfer loop 220.

Once the water 174, flowing through the fuel heat exchanger 210, is above a minimum threshold as measured by the first temperature sensor 240, the fuel bypass valve 214 is used to modulate (i.e., control) the flow of fuel 67 into the fuel heat exchanger 210. The fuel 67 may be modulated using the fuel bypass valve 214 to maintain the water 174 above the minimum threshold temperature. The water 174 is preferably at least eighty degrees Fahrenheit (80° F.) (twenty-six degrees Celsius (26° C.)) before the fuel 67 is introduced into the fuel heat exchanger to prevent instant freezing of the water 174, and thus the minimum threshold may be, for example eighty degrees Fahrenheit (80° F.) (twenty-six degrees Celsius (26° C.)) or more, such as, preferably, from eighty degrees Fahrenheit (80° F.) (twenty-six degrees Celsius (26° C.)) to one hundred sixty degrees Fahrenheit (160° F.) (seventy-one degrees Celsius (71° C.)). A water 174 temperature at the inlet to the fuel heat exchanger 210 of one hundred sixty degrees Fahrenheit (160° F.) (seventy-one degrees Celsius (71° C.)) or less minimize the potential foil boiling at altitude. As the temperature of the water 174 increases due to operation of the turbine engine 10, the selector valve 228 and/or the water pump 108 may be controlled to increase the flow of the water 174 through the first thermal transport system 200 to a maximum position. The fuel bypass valve 214 may be used to modulate the fuel 67 flowing into the fuel heat exchanger 210 as the flow of water 174 flowing through the heat transfer loop 220 is increased. The flow of the water 174 and the flow of the fuel 67 are increased until the turbine engine 10 reaches a full idle operation.

Once the combustor 26 is producing the combustion gases 66, the condenser 104 and the water separator 106 will have these hot combustion gases 66 flowing therethrough, providing heat to these components. During the start-up sequence, particularly for start-up when the turbine engine 10 has been exposed to sub-freezing temperatures while shutdown, the second heater 234 and the third heater 236 may be used to heat the water separator 106 and the condenser 104, respectively, to temperatures above the freezing point of water (thirty-two degrees Fahrenheit (32° F.)), such as from thirty-five degrees Fahrenheit (35° F.) (one degree Celsius (1° C.)) to fifty degrees Fahrenheit (50° F.) (ten degrees Celsius (10° C.)). The method of starting-up the turbine engine 10, thus may also include, using the fourth temperature sensor 246 to measure the temperature of the condenser 104. If the temperature of the condenser 104 is not above a heater threshold temperature (discussed above), the fourth temperature sensor 246 is used to heat the condenser 104 to the temperatures discussed above. If (or once) the temperature of the condenser 104 reaches the heater threshold temperature, the turbine engine 10 can be started, such as by igniting the fuel 67 in the combustor 26. Once the combustor ignition has occurred, the second heater 234 and the third heater 236 may be turned off. In some embodiments, the third temperature sensor 244, positioned in the water line fluidly connecting the water separator 106 with the water pump 108, can be used to control the second heater 234 during the startup sequence and determine when to turn off the second heater 234.

A method of shutting down the turbine engine 10 may include decelerating the turbine engine 10 to ground idle thrust. Then, the fuel bypass valve 214 is positioned to bypass all of the fuel 67 around the fuel heat exchanger 210 and through the fuel bypass line 212. The selector valve 228 is then positioned to direct all of the water 174 directly to the boiler 102, bypassing the heat transfer loop 220. The water pump 108 is then shut off. The combustion gases 66 continue to flow through the hot gas path 78 with the water pump 108 shut off allowing the condenser 104 and the water separator 106 to be dried out at temperatures above freezing. Once dry, the pump 86 that pumps the fuel 67 from the fuel tank 82, through the fuel delivery assembly 84, can be shut off to shut down the turbine engine 10.

As noted above, the engine controller 120 is configured to operate various aspects of the turbine engine 10, including, in this embodiment, the components described in the methods above. Accordingly, in some embodiments, the engine controller 120 is configured to execute the steps of the method discussed above. More specifically, for example, the processor 122 may execute a sequence of instructions stored on the memory 124 to operate the turbine engine 10 in the manner described above.

Figure 3:
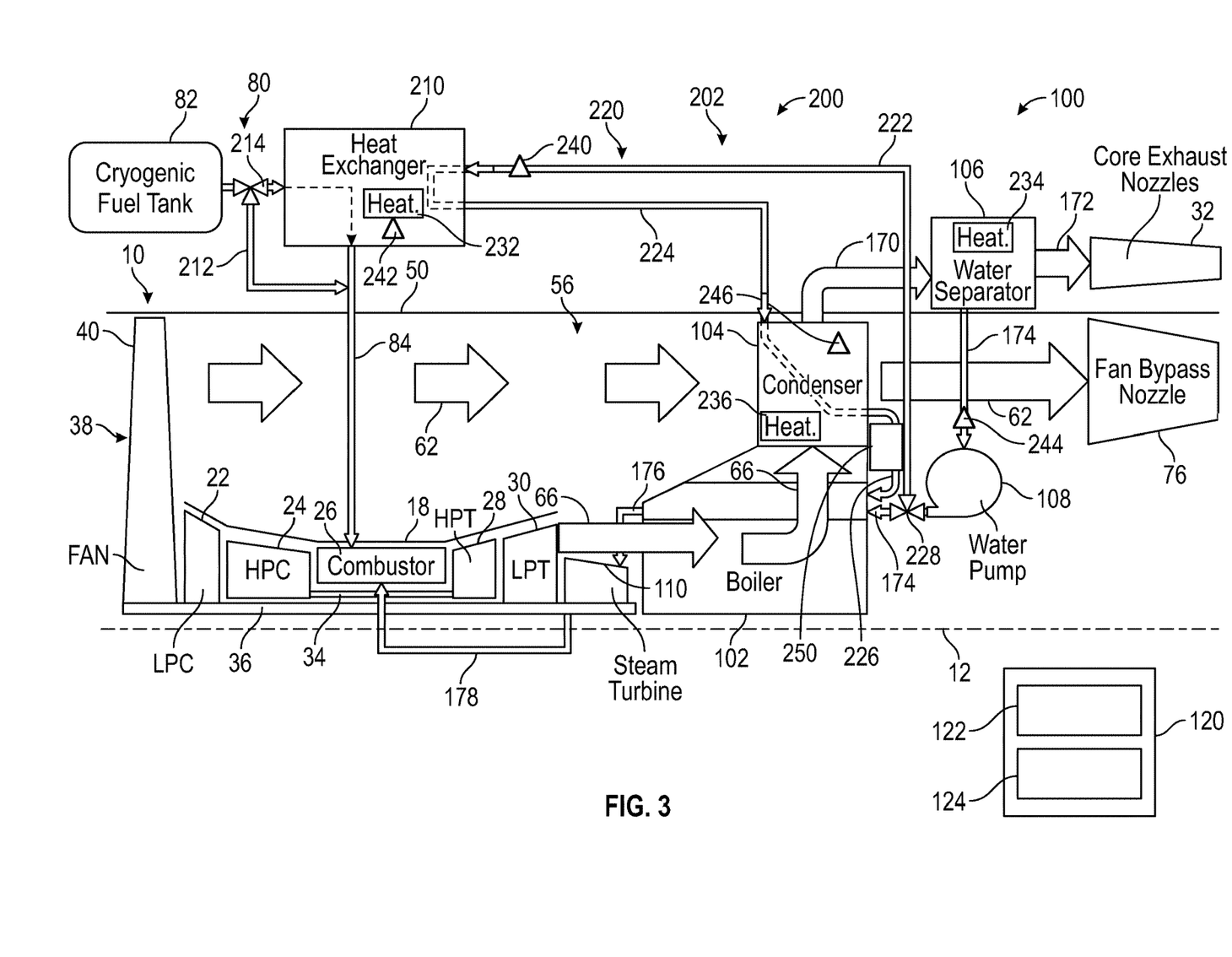
FIG. 3 is a schematic diagram of the turbine engine and the steam system with a thermal transport system according to an embodiment of the present disclosure.

FIG. 3 is a schematic diagram of the turbine engine 10 and the steam system 100 of FIG. 1 having a thermal transport system 202, according to the present disclosure. For clarity with the other thermal transport systems discussed herein, the thermal transport system 202 of this embodiment will be referred to as a second thermal transport system 202. The second thermal transport system 202 is similar to the first thermal transport system 200 discussed above with reference to FIG. 2. The same reference numerals will be used for components of the second thermal transport system 202 that are the same as or similar to the components of the first thermal transport system 200 discussed above. The description of these components above also applies to this embodiment, and a detailed description of these components is omitted here.

The water 174 in the heat transfer loop 220 of the first thermal transport system 200 discussed above with reference to FIG. 2 is routed between the fuel heat exchanger 210 and the condenser 104. The water 174, however, may be routed to other components to either transfer heat to those components or to receive heat from those components. The heat transfer loop 220 of the second thermal transport system 202 thus includes an additional heat exchanger. In this embodiment, the additional heat exchanger is a water/oil heat exchanger 250. The water/oil heat exchanger 250 is positioned in the return line 226 downstream of the condenser 104 and upstream of the boiler 102. The water/oil heat exchanger 250 may be located at other locations within the heat transfer loop 220, including in fluidic communication with the intermediate return line 224 downstream of the fuel heat exchanger 210 and upstream of the condenser 104. After flowing through the condenser 104, the water 174 is further heated by extracting heat (i.e., absorbing heat) from oil, such as lubrication oil, flowing through the turbine engine 10. The water/oil heat exchanger 250 may thus be used as a heat sink (e.g., an oil coiler) for the lubrication oil to cool the lubrication oil flowing through the turbine engine 10. The other (or additional) engine components also may include electrical devices, including motors, generators, and controls. This additional heat exchanger may be a heat exchanger or heat sink for other systems of the turbine engine 10 or aircraft, such as, for example, a cooler for an environmental control system (ECS) of the aircraft.

Figure 4:
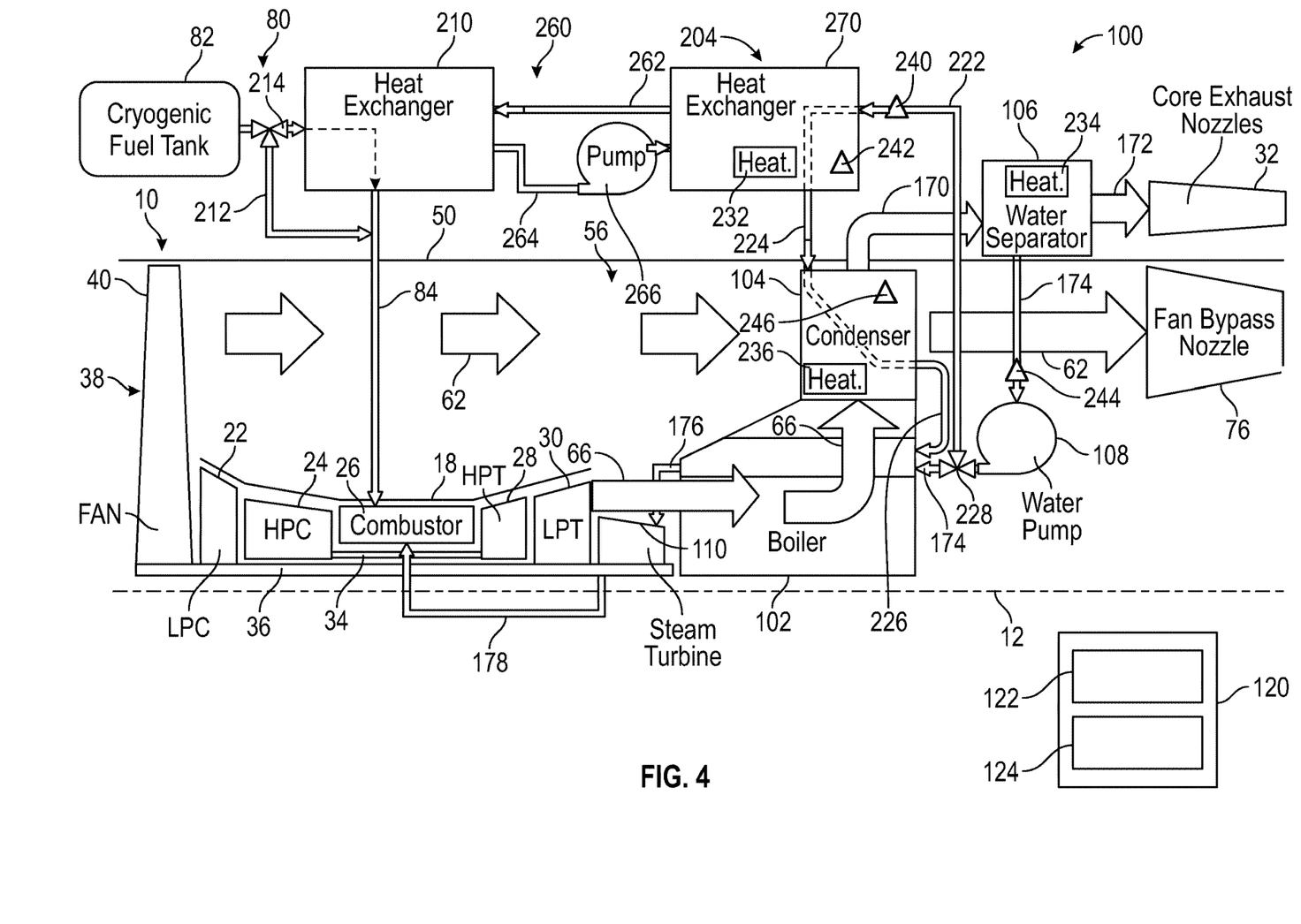
FIG. 4 is a schematic diagram of the turbine engine and the steam system with a thermal transport system according to an embodiment of the present disclosure.

FIG. 4 is a schematic diagram of the turbine engine 10 and the steam system 100 of FIG. 1 having a thermal transport system 204, according to the present disclosure. For clarity with the other thermal transport systems discussed herein, the thermal transport system 204 of this embodiment will be referred to as a third thermal transport system 204. The third thermal transport system 204 is similar to the first thermal transport system 200 discussed above with reference to FIG. 2. The same reference numerals will be used for components of the third thermal transport system 204 that are the same as or similar to the components of the first thermal transport system 200 discussed above. The description of these components above also applies to this embodiment, and a detailed description of these components is omitted here.

A single heat transfer medium or a working fluid (water 174) is used in the first thermal transport system 200. Using an additional working fluid (e.g., an intermediate heat transfer medium) may be advantageous with the fuel 67 at cryogenic temperatures and the water 174 at relatively hot temperatures (as discussed above). The third thermal transport system 204 of this embodiment thus includes an intermediate heat transfer loop 260 through which the intermediate heat transfer medium flows. With the fuel 67 at cryogenic temperatures, the intermediate heat transfer medium may be a fluid other than water, and suitable intermediate heat transfer mediums include, for example, helium, nitrogen, or carbon dioxide. When carbon dioxide is used, the carbon dioxide is preferably gaseous carbon dioxide and, more preferably supercritical carbon dioxide.

Instead of being directed to the fuel heat exchanger 210, the water 174 flows through the heat transfer loop 220 (referred to in this embodiment as a first heat transfer loop or a water heat transfer loop) into an intermediate heat exchanger 270. The intermediate heat exchanger 270 may be similar to the fuel heat exchanger 210 discussed above, but instead of having the fuel 67 flow therethrough, the intermediate heat transfer medium flows through the intermediate heat exchanger 270 and the heat from the water 174 is transferred from the water 174 and absorbed by the intermediate heat transfer medium.

The intermediate heat transfer loop 260 includes a supply line 262 fluidly connecting the intermediate heat exchanger 270 with the fuel heat exchanger 210. The intermediate heat transfer medium, after being heated in the fuel heat exchanger 210, flows from the intermediate heat exchanger 270 to the fuel heat exchanger 210. In the fuel heat exchanger 210, the heat is transferred from the intermediate heat transfer medium to the fuel 67 in a manner similar that discussed above for the water 174. The intermediate heat transfer loop 260 also includes a return line 264, fluidly connecting the fuel heat exchanger 210 with the intermediate heat exchanger 270. After transferring heat to the fuel 67 and being cooled, the intermediate heat transfer medium flows through the return line 264 from the fuel heat exchanger 210 to the intermediate heat exchanger 270.

The intermediate heat transfer loop 260 includes an intermediate fluid pump 266. The intermediate fluid pump 266 induces the flow of the intermediate heat transfer medium through intermediate heat transfer loop 260 between the fuel heat exchanger 210 and the intermediate heat exchanger 270. The intermediate fluid pump 266 may be located at any suitable location within the intermediate heat transfer loop 260, but, in this embodiment, the intermediate fluid pump 266 is located in the return line 264.

The turbine engine 10 of the embodiments discussed herein includes a steam system 100. The turbine engine 10 also includes a thermal transport system that may be used to transfer heat from the steam system 100 to the fuel 67 and to heat (or vaporize) the fuel 67. Using the water 174 and thermal transport systems discussed have the advantage of reducing the size of the boiler 102 by raising the temperature of the water 174 at the inlet of the boiler 102. If cryogenic fuel is heated by being routed through the condenser 104, the condenser 104 risks icing due to the extreme cold of the cryogenic fuel. Using the water 174 and the thermal transport systems discussed herein mitigates the risk of icing in the condenser 104, where the ice could block the bypass air 62 from the fan 38, reducing thrust.

Further aspects of the present disclosure are provided by the subject matter of the following clauses.

A turbine engine for an aircraft. The turbine engine includes a fuel delivery assembly for fuel to flow therethrough. The turbine engine also includes a core turbine engine and a fan having a fan shaft coupled to the core turbine engine to rotate the fan shaft. The turbine engine includes a core air flow path for core air to flow therethrough, a combustor, a core shaft, and a turbine. The combustor is located in the core air flow path to receive compressed air and fluidly coupled to the fuel delivery assembly to receive the fuel from the fuel delivery assembly. The fuel is injected into the combustor to mix with the compressed air to generate a fuel and air mixture. The fuel and air mixture is combusted in the combustor to generate combustion gases. The turbine is located downstream of the combustor to receive the combustion gases and to cause the turbine to rotate. The turbine is coupled to the core shaft to rotate the core shaft when the turbine rotates. The turbine engine further includes a condenser, a fuel heat exchanger, a boiler, and a steam turbine. The condenser is located downstream of the turbine to receive the combustion gases and to condense water from the combustion gases. The fuel heat exchanger is thermally coupled to the condenser to receive heat from the water. The fuel heat exchanger is located in the fuel delivery assembly to receive the fuel and to transfer the heat received from the water to the fuel. The boiler is located downstream of the fuel heat exchanger. The boiler receives the water and is fluidly connected to the combustor to receive the combustion gases and to boil the water to generate steam. The steam turbine is fluidly coupled to the boiler to receive the steam from the boiler and to cause the steam turbine to rotate. The steam turbine is coupled to the core shaft to rotate the core shaft when the steam turbine rotates.

The turbine engine of the preceding clause, further comprising a fuel tank holding fuel therein, the fuel delivery assembly being fluidly connected to the fuel tank to receive from the fuel tank.

The turbine engine of any preceding clause, wherein the combustor is fluidly coupled to the boiler to receive the steam from the boiler and to inject the steam into the combustor.

The turbine engine of any preceding clause, wherein the combustor is fluidly coupled to the steam turbine to receive the steam from the steam turbine and to inject the steam into the combustor.

The turbine engine of any preceding clause, wherein the fuel is a cryogenic fuel and the fuel tank is a cryogenic fuel tank for storing the fuel in the liquid phase.

The turbine engine of any preceding clause, wherein the fuel is hydrogen fuel.

The turbine engine of any preceding clause, further comprising a fuel bypass flow path selectively operable to redirect the fuel and to bypass the fuel heat exchanger.

The turbine engine of any preceding clause, further comprising a fuel bypass valve positioned in the fuel delivery assembly upstream of the fuel heat exchanger and selectively operable to redirect at least a portion of the fuel through the fuel bypass flow path.

The turbine engine of any preceding clause, wherein the fuel heat exchanger includes a heater.

The turbine engine of the preceding clause, wherein the heater is an electrical heater.

The turbine engine of any preceding clause, wherein the condenser includes a heater.

The turbine engine of the preceding clause, wherein the heater is an electrical heater.

The turbine engine of any preceding clause, wherein the fuel heat exchanger is fluidly coupled to the condenser to receive the water condensed by the condenser.

The turbine engine of any preceding clause, further comprising a heat transfer loop that includes a supply line to supply the fuel heat exchanger with the water condensed by the condenser.

The turbine engine of any preceding clause, further comprising a water pump in fluid communication with the boiler to direct the flow of water into the boiler, the supply line fluidly connected to the water pump at a location downstream of the water pump.

The turbine engine of any preceding clause, further comprising a valve in fluid communication with the supply line and a water line fluidly connecting the water pump with the boiler, the valve operable to direct at least a portion of the water through the supply line and to the fuel heat exchanger.

The turbine engine of any preceding clause, wherein the condenser generates an exhaust-water mixture when condensing the water from the combustion gases, the turbine engine further comprising a water separator located downstream of the condenser, the water separator separating the water from the exhaust-water mixture, the supply line fluidly coupled to the water separator at a position downstream of the water separator.

The turbine engine of any preceding clause, further comprising a water pump in fluid communication with the water separator to receive the water from the water separator and in fluid communication with the boiler to direct the flow of water into the boiler, the supply line fluidly connected to the water separator at a location downstream of the water pump.

The turbine engine of any preceding clause, wherein the water separator includes a heater.

The turbine engine of any preceding clause, wherein the heat transfer loop includes a return line fluidly connecting the fuel heat exchanger with the boiler for the water to flow from the fuel heat exchanger to the boiler.

The turbine engine of any preceding clause, further comprising a preheat heat exchanger located in the return line and fluidly coupled to the return line upstream of the boiler to heat the water flowing through the preheat heat exchanger.

The turbine engine of any preceding clause, wherein the preheat heat exchanger is the condenser, the condenser including a flow passage for the water to flow therethrough and to be preheated by the combustion gases flowing through the condenser.

The turbine engine of any preceding clause, wherein the heat transfer loop further includes an additional heat exchanger to heat or to cool the water flowing through the heat transfer loop.

The turbine engine of any preceding clause, wherein the additional heat exchanger is located in the return line downstream of the condenser and upstream of the boiler and heats the water flowing therethrough.

The turbine engine of any preceding clause, wherein the additional heat exchanger is a water/oil heat exchanger.

The turbine engine of any preceding clause, further comprising an intermediate heat exchanger that is fluidly coupled to the condenser to receive the water condensed by the condenser, heat being transferred from the water to an intermediate heat transfer medium in the intermediate heat exchanger, the fuel heat exchanger fluidly coupled to the intermediate heat exchanger to receive the intermediate heat transfer medium.

The turbine engine of any preceding clause, wherein the intermediate heat transfer medium is a fluid other than water.

The turbine engine of any preceding clause, wherein the intermediate heat transfer medium is one of helium, nitrogen, or carbon dioxide.

The turbine engine of any preceding clause, wherein the intermediate heat transfer medium is one of gaseous carbon dioxide or supercritical carbon dioxide.

The turbine engine of any preceding clause, further comprising an intermediate heat transfer loop that fluidly connects the intermediate heat exchanger with the fuel heat exchanger to circulate the intermediate heat transfer medium.

The turbine engine of any preceding clause, wherein the intermediate heat transfer loop includes an intermediate fluid pump to induce the flow of the intermediate heat transfer medium through the intermediate heat transfer loop.

The turbine engine of any preceding clause, wherein the intermediate heat transfer loop includes a supply line to supply the intermediate heat transfer medium to the fuel heat exchanger from the intermediate heat exchanger and a return line to supply the intermediate heat transfer medium to the intermediate heat exchanger from the fuel heat exchanger.

The turbine engine of any preceding clause, wherein the intermediate fluid pump is located in the return line.

The turbine engine of any preceding clause, further comprising a first heat transfer loop that includes a supply line to supply the intermediate heat exchanger with the water condensed by the condenser.

The turbine engine of any preceding clause, further comprising a water pump in fluid communication with the boiler to direct the flow of water into the boiler, the supply line fluidly connected to the water pump at a location downstream of the water pump.

The turbine engine of any preceding clause, further comprising a valve located in the supply line and in a water line fluidly connected the water pump with the boiler, the valve operable to direct at least a position of the water through the supply line and to the intermediate heat exchanger.

The turbine engine of any preceding clause, wherein the condenser generates an exhaust-water mixture when condensing the water from the combustion gases, the turbine engine further comprising a water separator located downstream of the condenser, the water separator separating the water from the exhaust-water mixture, the supply line fluidly coupled to the water separator at a position downstream of the water separator.

The turbine engine of any preceding clause, further comprising a water pump in fluid communication with the water separator to receive the water from the water separator and in fluid communication with the boiler to direct the flow of water into the boiler, the supply line fluidly connected to the water separator at a location downstream of the water pump.

The turbine engine of any preceding clause, wherein the first heat transfer loop includes a return line fluidly connecting the intermediate heat exchanger with the boiler for the water to flow from the fuel heat exchanger to the boiler.

The turbine engine of any preceding clause, further comprising a preheat heat exchanger located in the return line and fluidly coupled to the return line upstream of the boiler to heat the water flowing through the preheat heat exchanger.

The turbine engine of any preceding clause, wherein the preheat heat exchanger is the condenser, the condenser including a flow passage for the water to flow therethrough and to be preheated by the combustion gases flowing through the condenser.

The turbine engine of any preceding clause, wherein the first heat transfer loop further includes an additional heat exchanger to heat or to cool the water flowing through the heat transfer loop.

The turbine engine of any preceding clause, wherein the additional heat exchanger is located in the return line downstream of the condenser and upstream of the boiler to heat the water flowing therethrough.

The turbine engine of any preceding clause, wherein the additional heat exchanger is a water/oil heat exchanger.

The turbine engine of any preceding clause, wherein the core shaft is a low-pressure shaft and the turbine is a low-pressure turbine.

The turbine engine of any preceding clause, further comprising a low-pressure compressor connected to the low-pressure shaft to be driven by the low-pressure turbine and the steam turbine.

The turbine engine of any preceding clause, wherein the fan includes a plurality of blades.

The turbine engine of any preceding clause, wherein the fan shaft is coupled to the low-pressure shaft to be driven by the low-pressure shaft.

The turbine engine of any preceding clause, further comprising a bypass airflow passage. A first portion of air flowing into the fan flowing through the bypass airflow passage as bypass air and a second portion of the air flowing into the fan flowing through the core air flow path as core air. The condenser is positioned downstream of the boiler and in the bypass airflow passage for bypass air to cool the combustion gases and to condense the water from the combustion gases.

The turbine engine of any preceding clause, further comprising a low-pressure compressor positioned in the core air flow path upstream of the combustor, the low-pressure compressor being driven by the low-pressure shaft to compress the core air flowing through the core air flow path and to generate the compressed air.

The turbine engine of any preceding clause, further comprising a high-pressure shaft, a high-pressure turbine, and a high-pressure compressor. The high-pressure turbine is positioned downstream of the combustor to receive the combustion gases and to cause the high-pressure turbine to rotate. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor being driven by the high-pressure shaft to compress the core air flowing through the core air flow path and to generate the compressed air.

The turbine engine of any preceding clause, further comprising a bypass airflow passage for bypass air, the condenser positioned in the bypass airflow passage for bypass air to cool the combustion gases and to condense the water from the combustion gases, generating a cooled exhaust.

The turbine engine of any preceding clause, wherein the water separator is a cyclonic separator.

The turbine engine of any preceding clause, further comprising a core turbine engine and a steam system. The core turbine engine including the combustor and the turbine. The combustor and the turbine define a core air flow path. The steam system extracts water from the combustion gases using the condenser, vaporizes the water to generate steam using the boiler, and injects the steam into the core air flow path to add mass flow to the core air.

The turbine engine of the preceding clause, further comprising a nacelle, and a steam system. The fan including a plurality of fan blades that rotates to generate a volume of air. The nacelle circumferentially surrounds the fan. The nacelle defines a bypass airflow passage between the nacelle and the core turbine engine. The volume of air from the fan is split and flows into the bypass airflow passage as bypass air and flows into the core air flow path as the core air.

The turbine engine of the preceding clause, wherein a bypass ratio of the bypass air to the core air is greater than 18:1.

The turbine engine of any preceding clause, wherein the bypass ratio is in a range of 18:1 to 100:1.

The turbine engine of any preceding clause, wherein the bypass ratio is in a range of 25:1 to 85:1.

The turbine engine of any preceding clause, wherein the bypass ratio is in a range of 28:1 to 70:1.

The turbine engine of any preceding clause, wherein the core turbine engine further includes a compressor that compresses the core air to generate the compressed air. The compressor is coupled to the core shaft and defines a portion of the core air flow path.

The turbine engine of the preceding clause, wherein the compressor includes a high-pressure compressor and includes a compression ratio greater than 20:1.

The turbine engine of the preceding clause, wherein the plurality of stages of the compressor includes ten to twelve stages.

The turbine engine of any preceding clause, wherein the turbine includes a high-pressure turbine (HPT) and includes only one stage of HPT rotor blades and HPT stator vanes.

The turbine engine of any preceding clause, further comprising a low-pressure turbine.

The turbine engine of the preceding clause, wherein the low-pressure turbine has a low-pressure shaft coupled to the fan The turbine engine of any preceding clause, further comprising a low-pressure compressor coupled to the low-pressure shaft to be driven by the low-pressure turbine and the steam turbine.

The turbine engine of any preceding clause, the low-pressure turbine having a pressure expansion ratio in a range of 4.5:1 to 28:1.

The turbine engine of any preceding clause, the high-pressure turbine having a pressure expansion ratio in a range of 1.5:1 to 4:1.

A method of starting up a turbine engine, including the turbine engines of any preceding clause. The method includes causing fuel to flow from a fuel storage tank to a combustor, directing the fuel to bypass a fuel heat exchanger, measuring the temperature of the fuel heat exchanger, operating a first heater located within the fuel heat exchanger to heat the fuel heat exchanger to a first threshold temperature when the measured temperature of the fuel heat exchanger is less than the first threshold temperature, and causing water to flow through fuel heat exchanger when the measured temperature of the fuel heat exchanger is greater than the first threshold temperature.

The method of starting up a turbine engine of the preceding clause, wherein the fuel is a cryogenic fuel and the fuel tank is a cryogenic fuel tank for storing the fuel in a liquid phase.

The method of starting up a turbine engine of any preceding clause, wherein the fuel is hydrogen fuel.

The method of starting up a turbine engine of any preceding clause, further comprising causing the fuel to flow through the fuel heat exchanger after the water flows through the fuel heat exchanger.

The method of starting up a turbine engine of any preceding clause, wherein directing the fuel to bypass the fuel heat exchanger includes positioning a fuel bypass valve to direct the fuel through a bypass flow path to bypass the fuel heat exchanger.

The method of starting up a turbine engine of any preceding clause, wherein causing the water to flow through fuel heat exchanger includes positioning a water bypass valve to direct water into the fuel heat exchanger.

The method of starting up a turbine engine of any preceding clause, wherein causing the water to flow through fuel heat exchanger includes operating a water pump to direct water into the fuel heat exchanger.

The method of starting up a turbine engine of any preceding clause, further comprising modulating the flow of water to increase the amount of water flowing through the fuel heat exchanger.

The method of starting up a turbine engine of any preceding clause, further comprising modulating the flow of fuel to increase the amount of fuel flowing through the fuel heat exchanger.

The method of starting up a turbine engine of any preceding clause, further comprising bringing the turbine engine up to idle.

The turbine engine of any preceding clause, further comprising a controller that is configured to operate the turbine engine according to the method of starting up a turbine engine of any preceding clause.

A method of shutting down a turbine engine, including the turbine engines of any preceding clause. The method includes causing fuel to flow from a fuel storage tank to a combustor, directing all of the fuel to bypass a fuel heat exchanger, and directing the flow of water into a boiler, bypassing the fuel heat exchanger.

The turbine engine of any preceding clause, further comprising a controller that is configured to operate the turbine engine according to the method of shutting down a turbine engine of the preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine for an aircraft, the turbine engine comprising:
   a fuel delivery assembly for fuel to flow therethrough;
   a core turbine engine including:
      a core air flow path for core air to flow therethrough;
      a combustor located in the core air flow path to receive compressed air and fluidly coupled to the fuel delivery assembly to receive the fuel from the delivery assembly, the fuel injected into the combustor to mix with the compressed air to generate a fuel and air mixture, the fuel and air mixture being combusted in the combustor to generate combustion gases;
      a core shaft; and
      a turbine located downstream of the combustor to receive the combustion gases and to cause the turbine to rotate, the turbine coupled to the core shaft to rotate the core shaft when the turbine rotates;
   a fan having a fan shaft coupled to the core turbine engine to rotate the fan shaft;
   a condenser located downstream of the turbine to receive the combustion gases and to condense water from the combustion gases;
   a fuel heat exchanger thermally coupled to the water from the condenser to receive heat from the water, the fuel heat exchanger located in the fuel delivery assembly to receive the fuel and to transfer the heat received from the water to the fuel;
   a boiler fluidly connected to the condenser by a water flow path to receive the water from the condenser and fluidly connected to the combustor to receive the combustion gases and to boil the water to generate steam, wherein the fuel heat exchanger thermally coupled to the water flow path between the condenser and the boiler such that the boiler receives the water after the heat has been transferred from the water to the fuel;
   a supply line connected directly to a water pump and the fuel heat exchanger to supply the fuel heat exchanger with the water condensed by the condenser; and
   a steam turbine fluidly coupled to the boiler to receive the steam from the boiler and to cause the steam turbine to rotate, the steam turbine coupled to the core shaft to rotate the core shaft when the steam turbine rotates.

2. The turbine engine of claim 1, wherein the fuel heat exchanger is fluidly coupled to the condenser to receive the water condensed by the condenser.

3. The turbine engine of claim 2, further comprising a heat transfer loop that includes the supply line to supply the fuel heat exchanger with the water condensed by the condenser.

4. The turbine engine of claim 3, further comprising the water pump in fluid communication with the boiler to direct the flow of water into the boiler, the supply line fluidly connected to the water pump at a location downstream of the water pump.

5. The turbine engine of claim 4, further comprising a valve in fluid communication with the supply line and a water line fluidly connecting the water pump with the boiler, the valve operable to direct at least a portion of the water through the supply line and to the fuel heat exchanger.

6. The turbine engine of claim 3, wherein the condenser generates an exhaust-water mixture when condensing the water from the combustion gases, the turbine engine further comprising a water separator located downstream of the condenser, the water separator separating the water from the exhaust-water mixture, the supply line fluidly coupled to the water separator at a position downstream of the water separator.

7. The turbine engine of claim 6, further comprising a water pump in fluid communication with the water separator to receive the water from the water separator and in fluid communication with the boiler to direct the flow of water into the boiler, the supply line fluidly connected to the water separator at a location downstream of the water pump.

8. The turbine engine of claim 3, wherein the heat transfer loop includes a return line fluidly connecting the fuel heat exchanger with the boiler for the water to flow from the fuel heat exchanger to the boiler, the turbine engine further comprising a preheat heat exchanger located in the return line and fluidly coupled to the return line upstream of the boiler to heat the water flowing through the preheat heat exchanger.

9. The turbine engine of claim 8, wherein the preheat heat exchanger is the condenser, the condenser including a flow passage for the water to flow therethrough and to be preheated by the combustion gases flowing through the condenser.

10. The turbine engine of claim 9, wherein the heat transfer loop further includes an additional heat exchanger to heat or to cool the water flowing therethrough.

* * * * *